M. BOUFFART.
APPARATUS FOR RECORDING THE SPEED OF GASES.
APPLICATION FILED JAN. 28, 1911.

1,050,333.

Patented Jan. 14, 1913.

2 SHEETS—SHEET 1.

Witnesses:
Hugo Mock
Fred' R. Curtis

Inventor:
Maurice Bouffart
By Croydon Marks
Attorney

UNITED STATES PATENT OFFICE.

MAURICE BOUFFART, OF HERSTAL-LEZ-LIEGE, BELGIUM.

APPARATUS FOR RECORDING THE SPEED OF GASES.

1,050,333.      Specification of Letters Patent.      Patented Jan. 14, 1913.

Application filed January 28, 1911. Serial No. 605,276.

*To all whom it may concern:*

Be it known that I, MAURICE BOUFFART, a subject of the King of Belgium, and a resident of 31 Place Coronmeuse, Herstal-lez-Liege, in the Kingdom of Belgium, have invented certain new and useful Improvements in Apparatus for Recording the Speed of Gases, of which the following is a specification.

This invention has for its object to provide improved apparatus for recording the speed or delivery of gases, based on the principle of the Pitot tube, and it consists in constructing the float of such apparatus of a special cross sectional contour whereby all the speeds are recorded on one and the same scale.

The improved apparatus has the following advantages: 1. The lowest speeds as well as the highest speeds are recorded with the same "amplification," that is, the speed variations are recorded with the same clearness in the bottom as in the upper part of the diagram. 2. A diagram drawn by the apparatus on a sheet of unscaled paper, furnishes complete information because the scale of the ordinates is constant and known once for all. 3. An absolutely accurate calculation of the volume or total weight of gas which has passed through the duct between two given instants, can be easily and readily effected, because it is merely necessary to integrate the area of the diagram in which the scale of the ordinates is constant. 4. There is no need to trouble about any displacement of the zero line due to the slow evaporation of the liquid.

Figure 1:
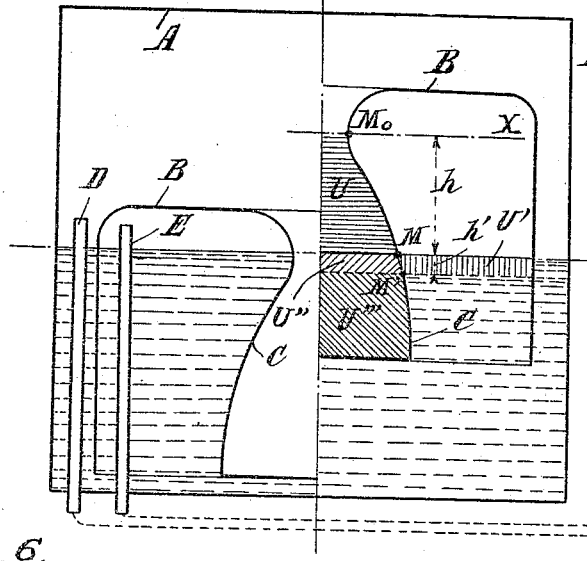
Figure 5:
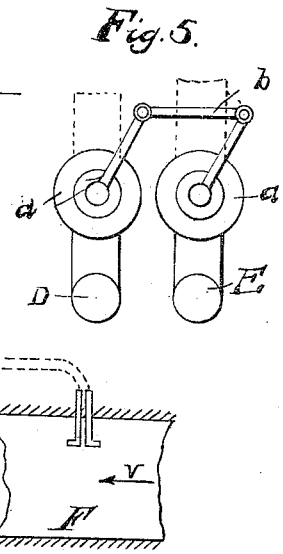
Figure 6:
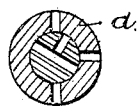
Figure 2:
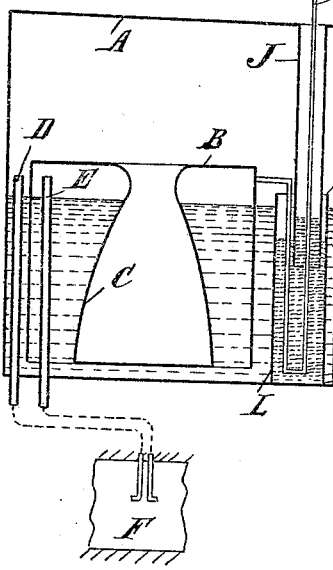
Figure 3:
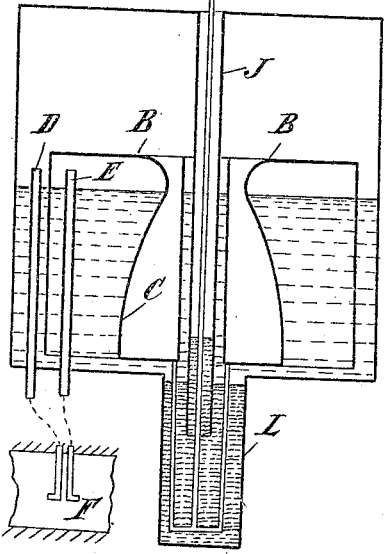
Figure 4:
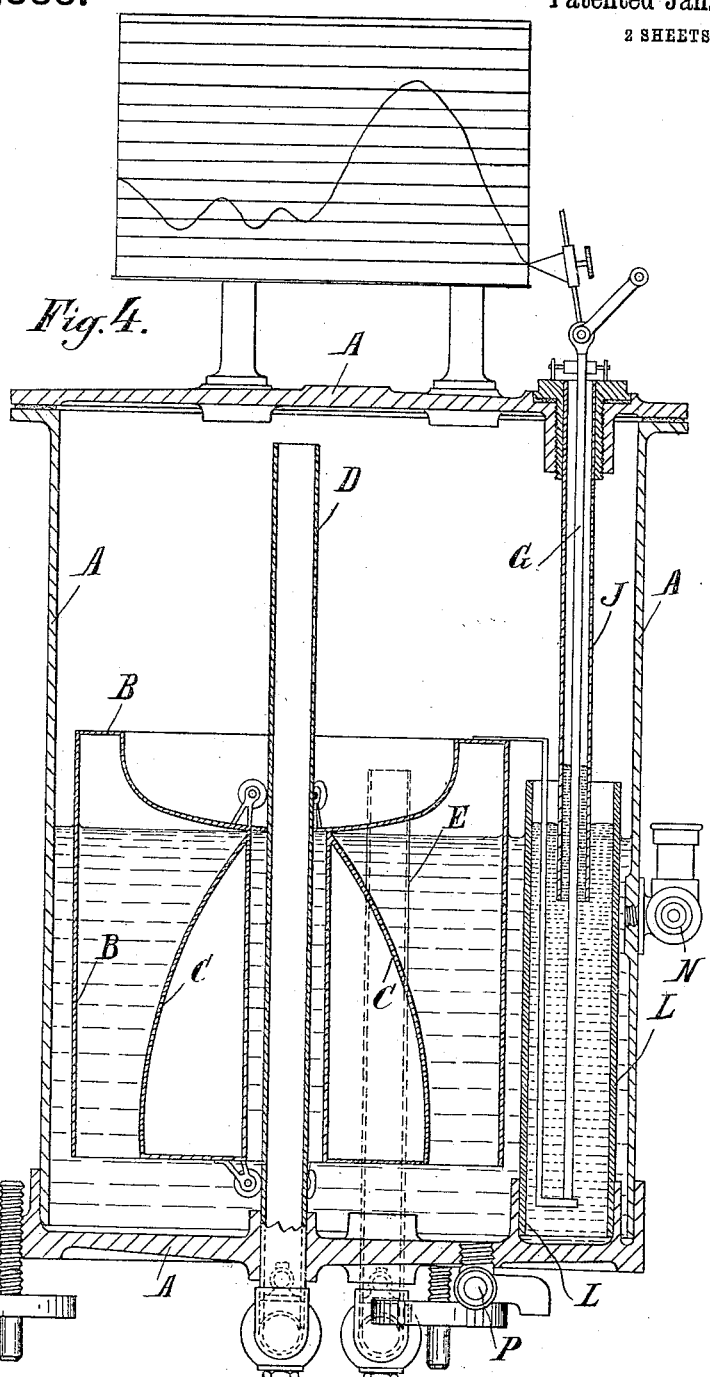

In the drawings:—Figure 1 is a diagram illustrating the cross sectional contour of the float. Fig. 2 is a vertical section of one form, Fig. 3 is a vertical section of another form, and Fig. 4 is a vertical section of a further form of the improved apparatus. Figs. 5 and 6 are details hereinafter described.

The improved apparatus comprises essentially a tank A containing liquid in which dips a bell B with a float C. The internal cavity of the float and the space external thereof communicate with the gas duct F respectively through the two branches D and E of a Pitot tube. Under these conditions it is known that the pressures on the inside and outside of the bell differ from each other at any moment by an amount which is proportional to the square of the speed of the gas in the duct F. The bell will therefore rise or fall accordingly as this speed increases or diminishes. In other words for every speed of the gas there will be a correspondingly different position of equilibrium of the bell.

The equation connecting the different positions of equilibrium of the bell B with the varying speeds of the gas in the duct F, obviously varies with the cross sectional contour of the float C.

In the improved apparatus the float C has a cross sectional contour such that when the speed of the gas in the duct increases two, three, four or five fold, etc., the vertical movement of the bell above its lower position will be 2, 3, 4 or 5, etc., times as great. In other words, the cross sectional contour of the float C is made such that the height $h$ through which the bell rises will always be equal to the product of the speed of the gas in the duct multiplied by a constant:—thus:—

$h = v \, x$ constant where $v$ = speed of the gas.

The effect of the peculiar cross sectional contour of the float may also be stated in the terms that all the speeds are recorded on the same uniform scale. The manner of determining this peculiar cross section is described hereinafter.

For the purpose of recording outside the tank A the vertical movements of the bell B, a rod G ending in a pen is connected to the bell B, whereby the pen is caused to draw a diagram whose ordinates represent the vertical movements of the bell and consequently the speed of the gas in the duct F on a strip of paper wound on a drum which is rotated at a uniform speed by clockwork.

In the improved apparatus the means for connecting the pen holder rod G to the bell B, without allowing any communication between the interior of the tank A and the atmosphere, comprises a tube J forming part of the wall of the tank A. The pen holder rod G extends through this tube, and is capable of moving freely therein. The lower end of the tube J dips constantly into a receptacle L containing a very dense liquid, such as mercury for instance.

The difference between the levels of the mercury inside and outside the tube J is greater the greater the difference between the static pressure in the duct F and the pressure of the atmosphere. Owing to the great density of mercury, the difference between the levels is always so small that there is no necessity for the tube J and consequently the apparatus itself, to be made of bulky dimensions. Further, since the pressure of the atmosphere acts only upon the cross section of the rod G, which is very small, the extraneous force imparted by said pressure is quite inappreciable and therefore there is no need for any compensating device such as is necessary in existing apparatus of this type.

The position of the receptacle L inside the tank A (Fig. 2) does not increase in any way the bulk of the apparatus. In the case of very high pressures in the duct however it may be preferred to place the receptacle L underneath the reservoir A, for example in the axial line of the bell as indicated in Fig. 3.

The construction shown in Fig. 4, comprises also the following accessory parts:— Each of the two Pitot tube branches D and E is provided with a cock $a$ at its entry into the tank (Figs. 5 and 6). These two cocks are operated by a common connecting rod $b$ so that the two branches D, E, can be placed simultaneously in communication either with the gas duct or with the atmosphere. The branch D extends up in the axis of the bell B so as to serve as a guide for the latter in its vertical movements. The tank A is provided with two cocks N and P which are usually closed and which serve for filling and emptying the tank when necessary.

The cross sectional contour of the float for effecting the object of this invention by enabling all speeds to be recorded on the same scale is determined in the following manner:—Let $p'$ = weight per unit volume of the liquid. $r$ = difference between the internal and external pressures on the float. This difference is proportional to the square of the speed $v$. Thus $$r = k.v^2.$$

$s$ = horizontal area of the top of the bell, $p$ = total weight of the bell (including the float and accessories). $U, U', U'', U'''$ = the volumes of revolution corresponding to the hatched surfaces shown in Fig. 1.

The right hand portion of Fig. 1, represents a position of equilibrium of the bell corresponding to a speed $v$ of the gas in the duct. The levels of the liquid differ from each other by the height $h'$, so that $$h' \, p' = r,$$

On the other hand, since the bell is in equilibrium, $$s.r + U'''.p' = p.$$

Then from the previous equation, we get $$s.h' + U''' = \frac{p}{p'}.$$

This last equation expresses the fact that the volume $(s.h' + U''')$ remains constant, and since the volume occupied by the liquid is obviously also constant, it follows that the sum of these two volumes is constant. This shows that the external level of the liquid is constant. With increasing speeds in the duct the level of the liquid in the interior of the bell falls, but the external level does not change.

The left hand portion of Fig. 1 represents the initial position of equilibrium of the bell. $v$ and therefore $r$, are $nil$. The level of the liquid inside the bell has reached the fixed external level. At this moment the weight of the liquid displaced by the float is equal to the total weight $p$ of the bell $$(U + U'' + U''')p' = p.$$

If this second equation be borne in mind, then the preceding equation written for any position of equilibrium of the bell becomes finally $U = U'$. If therefore the vertical cross sectional contour of the float be drawn in such a manner that each pair of points M and M' connected together by the equality of the volumes of revolution $U + U'$, shall satisfy the equation $$h = \sqrt{k'.h'},$$

(which expresses geometrically the fact that the height $h$ is a mean proportional between the height $h'$ and an arbitrarily chosen constant $k'$) it will be seen that for every position of equilibrium of the bell, $$h = \sqrt{k'.h'} = \sqrt{k'\frac{r}{p'}} = \sqrt{k'\frac{kv^2}{p'}} = \text{constant} \times v.$$

The float can thus be defined as follows:— It has a contour such that each couple of points M and M' connected together by the equality of two volumes $U$ and $U'$, shall satisfy at the same time the equation $$h = \sqrt{k'h'}$$

which expresses the fact that the height $h$ is a mean proportional between another height $h'$ and an arbitrarily chosen constant $k'$. In this statement the volumes $U$ and $U'$ and the heights $h$ and $h'$ have the following meanings:—$h$ is the height through which the bell has moved from its initial position, and $h'$ is the height through which the liquid (in direct contact with the float) has moved from its own initial position. U is the volume of the float taken at the height $h$, and U' is the volume of revolution taken at the height $h'$ between the side of the float and the wall which immediately bounds the liquid in which the float is immersed.

In the improved apparatus, the wall which immediately bounds the liquid in which the float is immersed, is the side of the bell. In the apparatus of the multiple liquid type, that is, in which the bell and float dip in liquids which are separate from each other, this wall is a fixed wall, and the float as hereinbefore defined is directly applicable to such apparatus.

Having now described my invention what I claim as new and desire to secure by Letters Patent is:—

1. In apparatus for recording the speed of a gas passing through a duct, the combination of a closed tank containing liquid and having an air space, a bell immersed in said liquid and having an air space, two Pitot branch tubes extending from said duct, one into the air space of said tank and the other into the air space of said bell, a float attached to said bell, said float having a special contour determined by the following geometrical condition namely that every two points M and M' connected together by the equality of two volumes U and U' shall satisfy simultaneously the equation $$h = \sqrt{k'h'},$$

as set forth.

2. In apparatus for recording the speed of a gas passing through a duct, the combination of a closed tank containing liquid and having an air space, a bell immersed in said liquid and having an air space, two Pitot branch tubes extending from said duct one into the air space of said tank, and the other into the air space of said bell, a float attached to said bell, a receptacle containing a heavy liquid such as mercury, communicating at its top with the space above the liquid in said tank, a tube immersed at its lower end in the heavy liquid in said receptacle and open to the atmosphere at its upper end, a penholder rod extending through said tube, a rotating drum mounted upon the closed tank, and a record sheet on said drum.

In testimony whereof I have signed my name to this specification in the presence of two subscribing witnesses.

MAURICE BOUFFART.

Witnesses:
LEONARD LÉVER,
ALEX LALLEMAND.